United States Patent [19]

Shook

[11] 3,933,391

[45] Jan. 20, 1976

[54] SADDLE SEAT MOUNT WITH SPECIAL SUPPORT POST AND COOPERATING CLAMP ASSEMBLY

[75] Inventor: William B. Shook, Columbus, Ohio

[73] Assignee: Thurston, Inc., Columbus, Ohio

[22] Filed: Nov. 11, 1974

[21] Appl. No.: 522,860

[52] U.S. Cl. .................... 297/195; 403/4; 403/191
[51] Int. Cl.² ........................ B62J 1/00; F16B 7/08
[58] Field of Search .......... 297/207, 195, 215, 196, 297/313; 248/377, 371; 403/4, 83, 84, 191

[56] References Cited
UNITED STATES PATENTS

| 523,944 | 7/1894 | Perkins | 297/195 |
|---|---|---|---|
| 540,118 | 5/1895 | Stearns | 297/195 X |
| 544,795 | 8/1895 | Seaman | 297/195 X |
| 892,102 | 6/1908 | Werner | 403/4 |
| 1,011,285 | 12/1911 | Verplast | 403/4 X |
| 2,308,083 | 1/1943 | Kalter | 403/4 |
| 2,600,101 | 6/1952 | Faulhaber | 403/4 |
| 2,669,283 | 2/1954 | Faulhaber | 403/4 X |

FOREIGN PATENTS OR APPLICATIONS

| 1,399,155 | 4/1965 | France | 297/195 |
| 347,817 | 4/1937 | Italy | 297/195 |
| 1,219,483 | 5/1960 | France | 297/195 |

Primary Examiner—James T. McCall
Attorney, Agent, or Firm—Mahoney, Miller & Stebens

[57] ABSTRACT

A bicycle seat mount for mounting the usual saddle seat including a special post and cooperating clamping bracket. The clamping bracket is adjustable to releasably clamp the wires of the saddle seat to permit forward and rearward adjustment and is attached to the post for vertical pivotal movement about the transversely disposed apex of an angular support surface provided at the upper end of the post.

9 Claims, 4 Drawing Figures

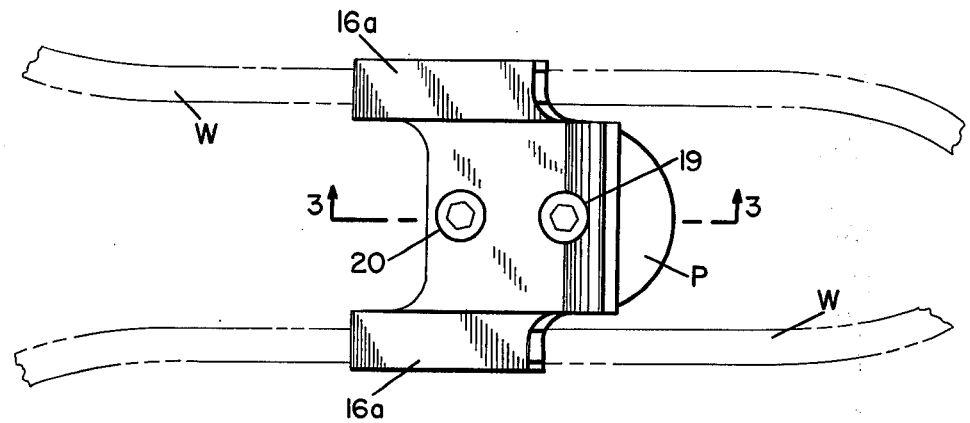
FIG. 2
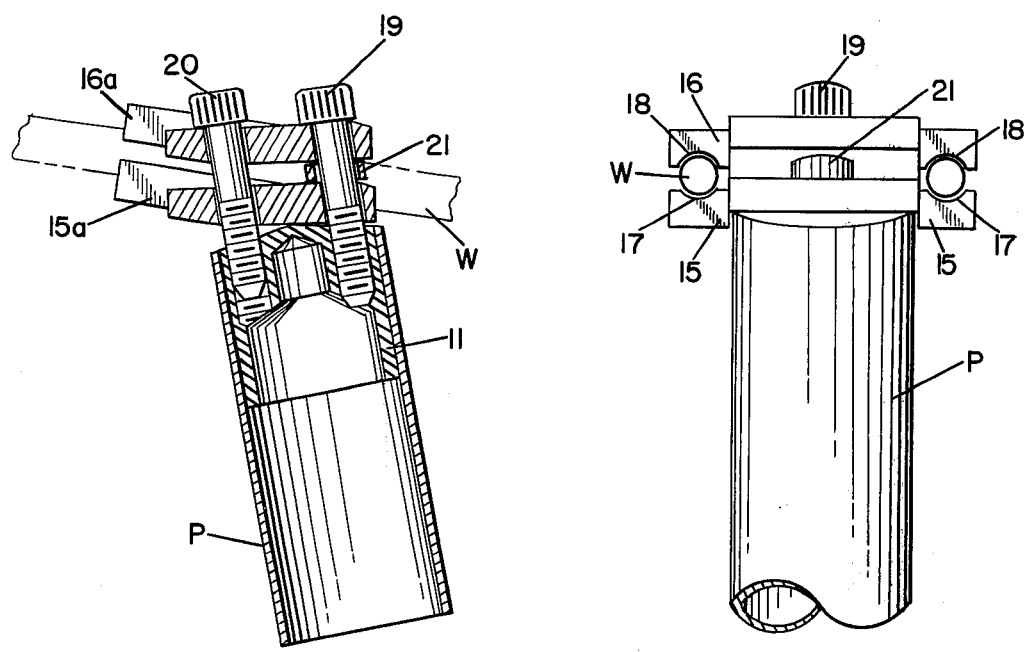
FIG. 3
FIG. 4

SADDLE SEAT MOUNT WITH SPECIAL SUPPORT POST AND COOPERATING CLAMP ASSEMBLY

BACKGROUND AND SUMMARY OF THE INVENTION

Saddle seats for bicycles or the like have been mounted in the prior art by many different types of seat wire clamping brackets carried in various ways on the upper end of the posts. They usually include the wire-clamping brackets carried by fittings which fit on the posts and extend radially therefrom. The clamping bracket is usually connected to the post fitting by a transverse pivot bolt about the axis of which the saddle seat is adjustably tilted upon loosening the bolt. It is difficult to tighten the bolt sufficiently to hold the seat in adjusted position and there is a tendency for the bolt to break under stress. The prior art assemblies are usually made heavy and combersome because they extend radially from the post and must resist resulting forces.

The present invention provides a simple seat wire clamp which permits forward and rearward adjustment with ease and which is connected to the post by a novel attaching arrangement including a special formation on the upper end of the post. The attachment is such that the major portion of the wire clamp is located directly over the post and attached directly thereto so that it will more effectively resist the forces to which the seat is subjected. This attachment and the positioning of the clamp directly over the post makes it possible to provide an assembly which is very simple and light in weight and which is free of the usual transverse pivot bolt and resultant disadvantages.

BRIEF DESCRIPTION OF THE DRAWINGS

The best mode contemplated in carrying out this invention is illustrated in the accompanying drawings in which:

FIG. 2 is a top view of the mounting bracket, with the seat wires indicated by broken lines.

FIG. 3 is an axial vertical sectional view through the seat bracket taken on line 3—3 of FIG. 2.

FIG. 4 is a side elevational view of the post and mounting bracket taken at a right angle to that of FIG. 3.

DETAILED DESCRIPTION OF THE INVENTION

Figure 1:
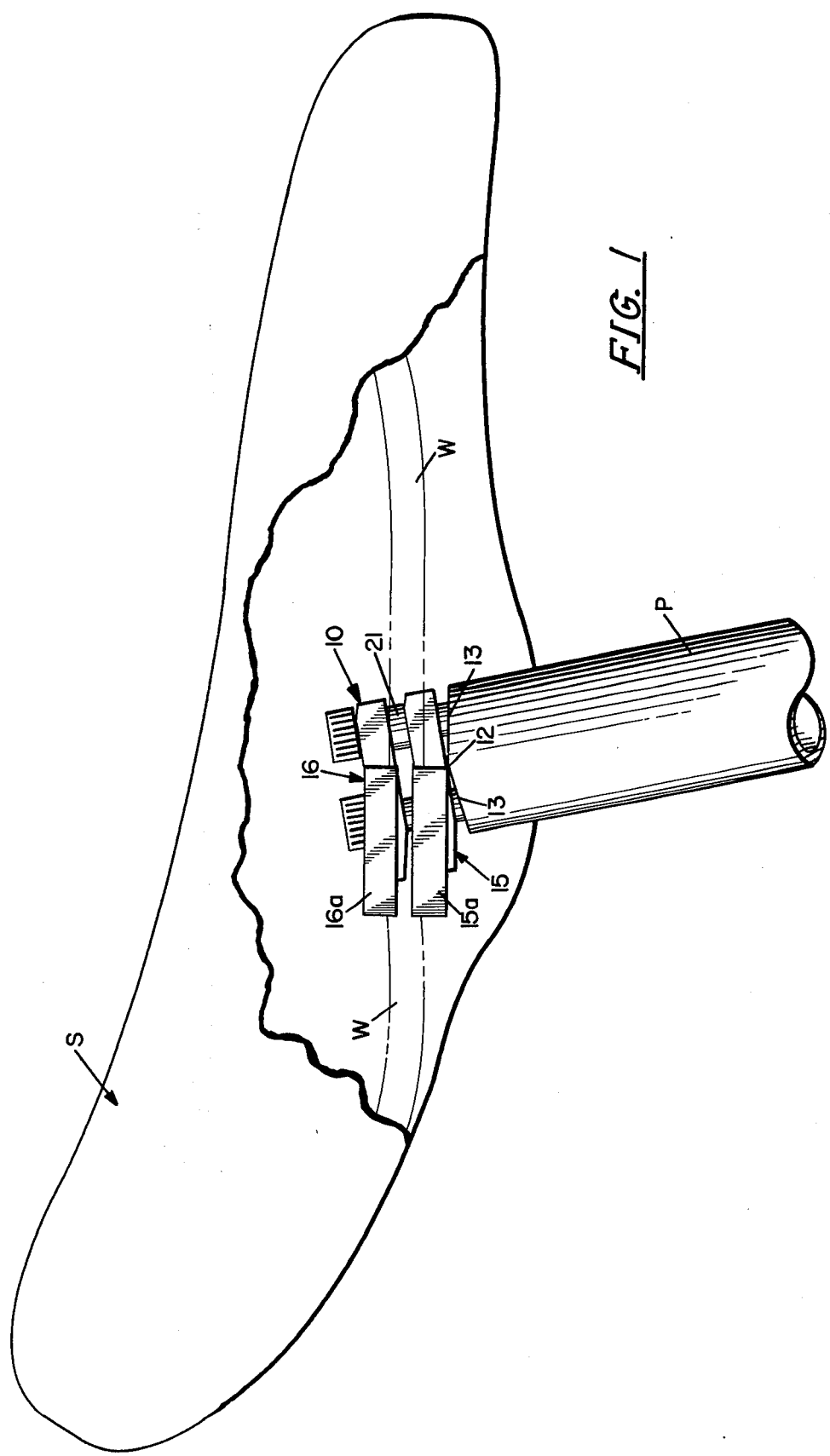
FIG. 1 is a side elevational view showing a saddle seat partly broken away to show the mounting clamp bracket and upper end of the post.

With specific reference to FIG. 1 of the drawings, a common bicycle saddle seat is shown generally at S, the mounting bracket assembly of this invention is indicated generally at 10, and the support post is indicated at P with a special formation at its upper extremity to provide a pivot and support surface according to this invention. The bracket 10 is adapted to clamp to the substantially parallel portions of the usual pair of seat wires W which extend longitudinally or forwardly and rearwardly of the seat.

According to this invention, the upper end of the post P is formed to provide an angular support surface which has a transversely disposed vertex or summit line and which has surface areas on opposite sides of that line declining forwardly and rearwardly, respectively. This surface is provided by means of a plug 11 which is hollow but has a closed upper end and which is inserted in the open upper end of the tubular post P. This post is shown slightly inclined rearwardly and the plug may be retained therein by any suitable means such as by cementing. The upper end of the post and cooperating plug are formed in any suitable manner to provide the support surface with the transversely disposed vertex line 12 having the downwardly inclined surface areas 13, respectively forwardly and rearwardly thereof. This surface arrangement is adapted to support the bracket assembly 10 positioned directly thereabove for tilting movement forwardly or rearwardly about the vertex line 12 which may be considered the pivot axis and which is at the axis of the post.

The bracket assembly consists of a lower support element 15 and an upper clamp element 16 for cooperating therewith. The lower element has a flat lower surface which rests on the transverse vertex line 12. It is provided with parallel wire-receiving cradling grooves 17 in its upper surface. The upper clamp element 16 is provided with similar aligning wire-embracing grooves 18 in its lower surface. Clamping bolts are passed freely downwardly through aligning opening in the upper and lower elements 16 and 15 and are tapped into sockets in the plug 11. These bolts include a bolt 19 forwardly of the pivot line 12 and a bolt 20 rearwardly of that line. A spacer washer 21 is provided around bolt 19 and is of such thickness that the upper element 16 can move toward element 15 to clamp the wires W but its movement toward the lower element is limited. Thus, the bolts not only clamp the upper element 16 to the lower element 15 but also provide means for tilting or rocking the bracket assembly and, therefore, the entire seat about the pivot support line 12.

It will further be apparent that when the clamping element 16 is released sufficiently from the seat wires by proper adjustment of all the bolts 19 and 20, the wires W may be slipped forwardly or rearwardly on the bracket assembly to thereby adjust the seat forwardly or rearwardly.

It will be noted especially from FIG. 1 that most of the assembly 10 is located directly over the upper end of the post P, although the members 15 and 16 do have rearwardly extending lug formations 15a and 16a. Furthermore, it will be noted that the attachment of the bracket assembly is directly into the post, the bolts 19 and 20 being anchored directly into the plug 11 thereof. The direct support of the bracket assembly on the post with most of it directly over the post makes it possible to use a more simple seat mounting assembly and one which is lighter in weight. Furthermore, it is not necessary to provide a transverse pivot pin or bolt to take the various stresses developed on the seat and these stresses will actually tend to keep the plug in the post. The use of the spacer 21 between the clamping elements 15 and 16 will ensure that the actual clamping of the wires W will be behind the pivot support line 12. Without this spacer there would be a tendency for the forward end of member 15 to swing up towards member 16, due to leverage of wires W resulting from weight on the rearward part of the seat, thereby tending to swing the rear lugs 15a downwardly from the wire.

It will be apparent from the above that this invention provides a simple light-weight mount for a saddle-type bicycle seat with ready adjustment forwardly, rearwardly or tilting downwardly or upwardly. The adjustment of the seat when once made is maintained. The mount is such that forces developed on the seat will tend to maintain the cooperative relationship of the parts without breakage.

Having thus described the invention, what is claimed is:

1. A seat mount for a bicycle seat or the like comprising a post having an angular formation on its upper end with a transverse vertex line and areas which decline downwardly both forwardly and rearwardly from the vertex line, a bracket assembly connectable to the seat and having a lower surface disposed in contacting engagement with said vertex line permitting tilting movement of the bracket assembly about said vertex line which supports said bracket assembly thereon, and adjusting bolts connected to the bracket assembly and the upper end of the post forwardly and rearwardly of the vertex line to tilt the bracket assembly about said line.

2. A seat mount according to claim 1 in which the post is a hollow post with an open upper end, a plug inserted and secured in the end and having a closed upper end, the post and plug being formed to provide the angular formation as a support for the seat.

3. A seat mount according to claim 2 in which the adjusting bolts are tapped into the closed upper end of the plug forwardly and rearwardly of the vertex.

4. A seat mount for a bicycle seat or the like comprising a post having an angular formation on its upper end with a transverse vertex line and areas which decline downwardly both forwardly and rearwardly from the vertex line, a bracket assembly connectable to wires of the seat and resting on said vertex line, said bracket assembly including a lower support element with a substantially flat lower surface resting on said vertex line and an upper clamping element for clamping the seat wires to said lower support element, and adjusting bolts connected to the bracket assembly and the upper end of the post forwardly and rearwardly of the vertex line to tilt the bracket assembly about said line.

5. A seat mount according to claim 4 in which the lower support element has wire-cradling grooves in its upper surface and the upper element has aligning wire-embracing grooves in its lower surface.

6. A seat mount according to claim 5 in which the bolts pass freely through the upper and lower bracket elements and a spacer washer is provided around the bolt which is forwardly of the vertex line and between the two elements.

7. A seat mount for a bicycle seat or the like comprising a post having an angular formation on its upper end with a transverse vertex line and areas which decline downwardly both forwardly and rearwardly from the vertex line, a bracket assembly connectable to wires of the seat and resting on said vertex line, said bracket assembly including a lower support element resting on the vertex line and an upper clamping element for clamping the seat wires to said lower support element, adjusting bolts connected to the bracket assembly and the upper end of the post forwardly and rearwardly of the vertex line to tilt the bracket assembly about said line, and spacer means disposed between the two elements of the bracket assembly forwardly of said vertex line which permits clamping of said wires but limits movement of the upper element toward the lower element forwardly of the vertex line.

8. A seat mount according to claim 7 in which said bracket assembly is located mainly above the post but the upper and lower elements thereof have rearwardly extending wire-embracing lugs.

9. A seat mount for a bicycle seat or the like comprising a post having an upper end, a bracket assembly connectable to a bicycle seat and having a lower surface disposed in contacting engagement with and supported on the upper end of said post, one of said lower bracket assembly surface and said upper post end having an angular formation with a transverse vertex line and areas which recede both forwardly and rearwardly of the vertex line and the other having a cooperative surface bearing against said vertex line thereby permitting tilting of said bracket assembly relative to said post, and adjusting bolts connected to said bracket assembly and to the upper end of said post forwardly and rearwardly of the vertex line to tilt the bracket assembly about the vertex line.

* * * * *